US008607335B1

(12) United States Patent
Liu et al.

(10) Patent No.: US 8,607,335 B1
(45) Date of Patent: Dec. 10, 2013

(54) INTERNET FILE SAFETY INFORMATION CENTER

(76) Inventors: Gary Gang Liu, Plano, TX (US); David Cook, Dallas, TX (US)

( * ) Notice: Subject to any disclaimer, the term of this patent is extended or adjusted under 35 U.S.C. 154(b) by 851 days.

(21) Appl. No.: 11/636,009

(22) Filed: Dec. 9, 2006

(51) Int. Cl.
- *G06F 11/00* (2006.01)
- *G06F 12/14* (2006.01)
- *G06F 12/16* (2006.01)
- *G08B 23/00* (2006.01)

(52) U.S. Cl.
USPC .................. 726/22; 726/23; 726/24; 726/25; 713/188

(58) Field of Classification Search
USPC ......... 726/30, 22–24; 713/170, 187; 707/698, 707/697, 736–752
See application file for complete search history.

(56) References Cited

U.S. PATENT DOCUMENTS

| | | | |
|---|---|---|---|
| 6,678,866 B1 * | 1/2004 | Sugimoto et al. ............. | 715/203 |
| 7,096,493 B1 | 8/2006 | Liu | |
| 7,337,319 B2 * | 2/2008 | Patrick .......................... | 713/168 |
| 7,591,022 B2 * | 9/2009 | Carpentier et al. ............. | 726/30 |
| 7,760,986 B2 * | 7/2010 | Beuque ........................... | 386/82 |
| 2003/0167402 A1 * | 9/2003 | Stolfo et al. ................... | 713/200 |
| 2005/0132184 A1 * | 6/2005 | Palliyil et al. ................. | 713/152 |
| 2005/0165698 A1 * | 7/2005 | Cho et al. ........................ | 705/67 |
| 2006/0075494 A1 * | 4/2006 | Bertman et al. ................ | 726/22 |
| 2007/0038579 A1 * | 2/2007 | Ansley ............................ | 705/64 |

OTHER PUBLICATIONS

Microsoft, "Microsoft Computer Dictionary 5th Edition", 2002, Microsoft, 5th Edition, pp. 41 & 252.*

* cited by examiner

*Primary Examiner* — Ashok Patel
*Assistant Examiner* — Daniel Potratz
(74) *Attorney, Agent, or Firm* — Fish & Richardson P.C.

(57) ABSTRACT

An improved Internet File Safety Information Center (IFSIC) is disclosed. The improved IFSIC allows an Internet user to look up the authenticity and safety information about a file or group of files by computing a hash value from the file or group of files and sending the hash value to a central server on the Internet to retrieve such information. A user identifier and other information can be sent to the central server along with the hash value. The improved IFSIC can be supported by targeted advertising, can provide file update information, can provide a better filter for files attached to email messages, and can be used to ensure the integrity of operating systems and installed programs.

23 Claims, 2 Drawing Sheets

System 100

INTERNET FILE SAFETY INFORMATION CENTER

FIELD OF THE INVENTION

This invention relates generally to computer security and more particularly to a system and method to enhance the safety of files distributed over the Internet or other distribution channels.

BACKGROUND OF THE INVENTION

In a public computing network, such as the Internet, anyone can distribute files. Malicious people can distribute fake versions or virus infected versions of legitimate popular software programs and other types of files. Several "Trojan horse" and other malware attacks have occurred due to some popular programs distributed over the Internet. In addition to distribution using the Internet, there are also many ways a file can be distributed publicly, for example, using "Shareware" CDs (compact disks). Many programs are also pre-installed on a computer shipped to the end-user. In all these cases, there is a need for the end-user to make sure that a file received through a public distribution channel is authentic and safe before using it.

File safety is conventionally provided in two ways. First, anti-virus software can be used by each individual user to scan received files. This solution is reactionary, in that first a virus must be identifiable by the anti-virus software. Conventional anti-virus software programs provide little or no protection against new viruses. A virus has to first be discovered, then, a considerable amount of research may be required to be performed to find ways to detect and destroy the virus. Finally, the solution has to be distributed to potentially millions of anti-virus software users. This is very inefficient. Alternatively, a digital signature can be applied to a file to ensure file authenticity. The digital signature can be verified prior to using or accessing the file. This solution is also problematic. The creator of a file has to take actions to certify their public keys and digitally-sign the file to be distributed. Since this requires a considerable amount of work and cost, not many files distributed over the Internet have been signed by their authors, even though the technology has been available for many years. Many useful files distributed publicly are not digitally-signed. A malicious person can attack these unsigned files. Another problem of this approach is that the files are not generally authenticated in the real time. That is, in general, the file is authenticated one time by the creator. If some virus or other defects are discovered in the file after it is digitally-signed, the creator may not be able to tell all the users to avoid that signed file, especially when the file has already been burned into CDs and distributed publicly.

In a U.S. Pat. No. 7,096,493 co-owned by the same inventors of the current invention, Gary Liu described an Internet File Safety Information Center ("IFSIC") system to enhance file safety. The system stores the safety information about each file in a central server indexed by the hash of the file. When a user computes a hash from a file downloaded or otherwise obtained and presents the hash to the central server, the central server will return the safety information about that file. The system is secure if a cryptographically secure hash function is used. A user having an authentic file will always compute the correct hash value and will see the information related to the authentic file. On the other hand, a user with a modified or bogus version of a file will always compute a different hash value and will see different information or no information. A user having a file that is known to be malicious will always see the information that contains warnings about the malicious file. However, Gary Liu did not describe several possible improvements that can make the system better.

For example, an end-user using the system to check the safety information regarding one file may want to know whether the file is the latest version, and if not, where to get the latest version, etc. It may also be desirable that advertising materials and information about other similar or dissimilar files be displayed to the user. In these cases, the information returned from the IFSIC should contain not only the information about the file being checked, but also advertising materials and information about other similar or dissimilar files. Although Gary Liu has recognized that the information about a file can be any type of information, not restricted to file safety information, he did not specifically point out that the IFSIC can be supported by advertising and can be used to provide information about file updates.

In the system described by Gary Liu, the hash of a file is sent to the central server to retrieve the information about the file without identifying the user. In many situations, it is desirable that an identifier of the user be sent to the central server along with the hash of the file. This allows a profile of the user to be established for better targeted advertising or for notifying the user about file updates, and in case a file originally determined to be safe is later discovered to be unsafe or having flaws, the user can be notified. Also, the system would allow the end-user to periodically check all files against the IFSIC to proactively remedy this problem.

Many computer files always go together. A software program may include several executable programs (EXEs), dynamical link libraries (DLLs), and other types of files. An operating system pre-installed on a computer shipped to an end-user can contain hundreds or even thousands of systems files. Although the IFSIC disclosed by Gary Liu can be used to check the authenticity of these files one-by-one, it would be much more efficient if several files can be grouped together in a certain order to compute a hash value and use the hash value to retrieve the authenticity information about the group of files. Furthermore, the checking of the system files does not have to be initiated by a user, it can be automatically started periodically to ensure the system integrity. In the event that a large group of files is being checked collectively and the result is not a positive match, then each individual file in the group can automatically be checked to determine which of the individual files are bogus or out-of-date.

Malicious or unwanted programs, such as spyware and adware are often installed into a system without the user's knowledge. There is a need to conduct a complete check of a computer system to ensure that every file that could be potentially harmful, such as executable programs (EXEs), dynamical link libraries (DLLs), visual basic scripts (VBS files), etc. are authentic and safe.

Files distributed through email carry higher risks than files distributed at a downloading web site or from shareware CDs. For this reason, many email programs and email servers block executable file attachments or other potentially harmful attachments indiscriminately. Email users often become frustrated when a file attachment that is known to be safe is indiscriminately blocked. On the other hand, because the attachment blocking is often based on the file extension or the MIME type of the file, it is very easy to circumvent such a blocking mechanism by simply renaming the file into a different type. There is a need for a blocking mechanism that cannot be circumvented by renaming the files and will not block files that are already known to be safe but would otherwise be blocked because of the file extension or MIME type.

There is a need to improve the IFSIC to provide all the desirable features described above.

SUMMARY OF THE INVENTION

In one aspect, the invention provides a system for enhancing safety of computer file distribution. The system includes a server computer connected to a computer network, and at least one user terminal also connected to the network. The server computer includes one or more electronic records, wherein each record includes information about a group of files and is indexed by a hash value computed from the group. A group can be a single file or refer to multiple files. The user terminal is operable to verify the authenticity of a group of files by computing the hash value of the group, retrieving from the server computer the information about the group in a single authentication communication with the server computer, and displaying the information about the group along with auxiliary information, such as advertising information and/or update information related to the group of files. A user identifier can be submitted to the server computer along with the computed hash when retrieving the information about the group of files. A user identifier could, for example, be the email address of the user. The server computer can use the user identifier and/or the category of the group of files to determine the type of auxiliary information to send back to the user terminal. The user identifier can be associated with a pair of public and private keys for authenticating the user. A confirmation email can be sent to the user's email address to confirm that the owner of the keys also owns the email address.

In another aspect, the invention provides a system to ensure integrity of the operating system or installed programs. The system includes a server computer to store one or more electronic records each containing information associated with one group of files and index the electronic records according to hash values computed from the associated groups of files; and a second computer operable to compute a hash value from a first group of files and send the hash value to the server computer, in a single authentication communication with the server computer in order to retrieve information associated with the first group of files. The second computer may obtain the list of files in a given group by querying the server computer about that group. The second computer can identify a group of files, compute a hash value from the group, and use the hash value to retrieve authenticity information from the server computer to determine whether all the files in the group are authentic. If the information returned from the server computer fails to confirm the authenticity of all the files, the user of the second computer will be alerted that the system integrity has been breached. In this case, the second computer may also check the authenticity of each individual file in the group to determine which file has been modified. A user identifier can also be sent to the server computer along with the hash value.

In another aspect, the invention provides a system to ensure safety of files attached to email messages. The system includes a server computer to store one or more electronic records each containing information associated with a group of at least one file and index the electronic records according to hash values computed from the associated groups of files; and a second computer operable to compute a hash value from a file or a group of files attached to an email message, retrieve information associated with the file or a group of files by making a single authentication communication with the server computer, and use the information returned from the server computer to decide whether to allow the group of files to be transmitted or received in the email message. The second computer can be an email server, a front-end computer before an email server, or an end user computer that includes an email client.

In another aspect, the invention provides a system to ensure the integrity of a computer system and to discover potentially harmful, unwanted programs. The system includes a server computer to store one or more electronic records each containing information associated with one group of files containing at least one file and index the electronic records according to hash values computed from the associated file or group of files; and a second computer operable to identify each potentially harmful file or group of files in the second computer, computing a hash value from the identified file or group of files, and sending the hash value to the server computer in a single authentication communication with the server computer in order to retrieve information associated with the potentially harmful file or group of files. The user of the second computer can be alerted if the information retrieved from the server computer fails to verify the safety of to the identified file or group of files. The second computer can identify potentially harmful file or group of files according to the file type. For example, all executable programs or dynamical link libraries may be identified as potentially harmful.

In a further aspect, a system is provided to automatically index downloadable digital content available on the Internet according the hash values computed from the digital content. The system include a server computer operable to search for downloadable files over the Internet by downloading web pages and following hyperlinks contained in the web pages to more web pages, compute a hash value from each downloadable file found in the search, and store the URL of the downloadable file in a record indexed by the hash value; and a second computer operable to retrieve the record by sending the hash value to the server computer, in a single authentication communication with the server computer. The use of this robotic-like or crawler-like feature can also identify URLs that have downloadable content that may be proprietary.

Aspects of the invention can include one or more of the following advantages. The system of U.S. Pat. No. 7,096,493 is improved so that it can be supported by selling advertising. The advertising can be better targeted by inclusion of a user identifier and a user profile for each user. The system can be used to ensure the integrity of system files or installed programs by computing a hash value on a group of multiple files in a specific order and check with a central server to ensure the integrity of the system or installed programs. By grouping multiple files together, the bandwidth required in the central server is greatly reduced. The system can be used to check the safety of file attachments received in email messages to avoid indiscriminately blocking certain type of attachments. The selective blocking mechanism cannot be circumvented by renaming the attachment files.

These and other advantages will be apparent upon a review of the specification, the drawings and attached claims.

DETAILED DESCRIPTION OF THE PREFERRED EMBODIMENT

Figure 1:
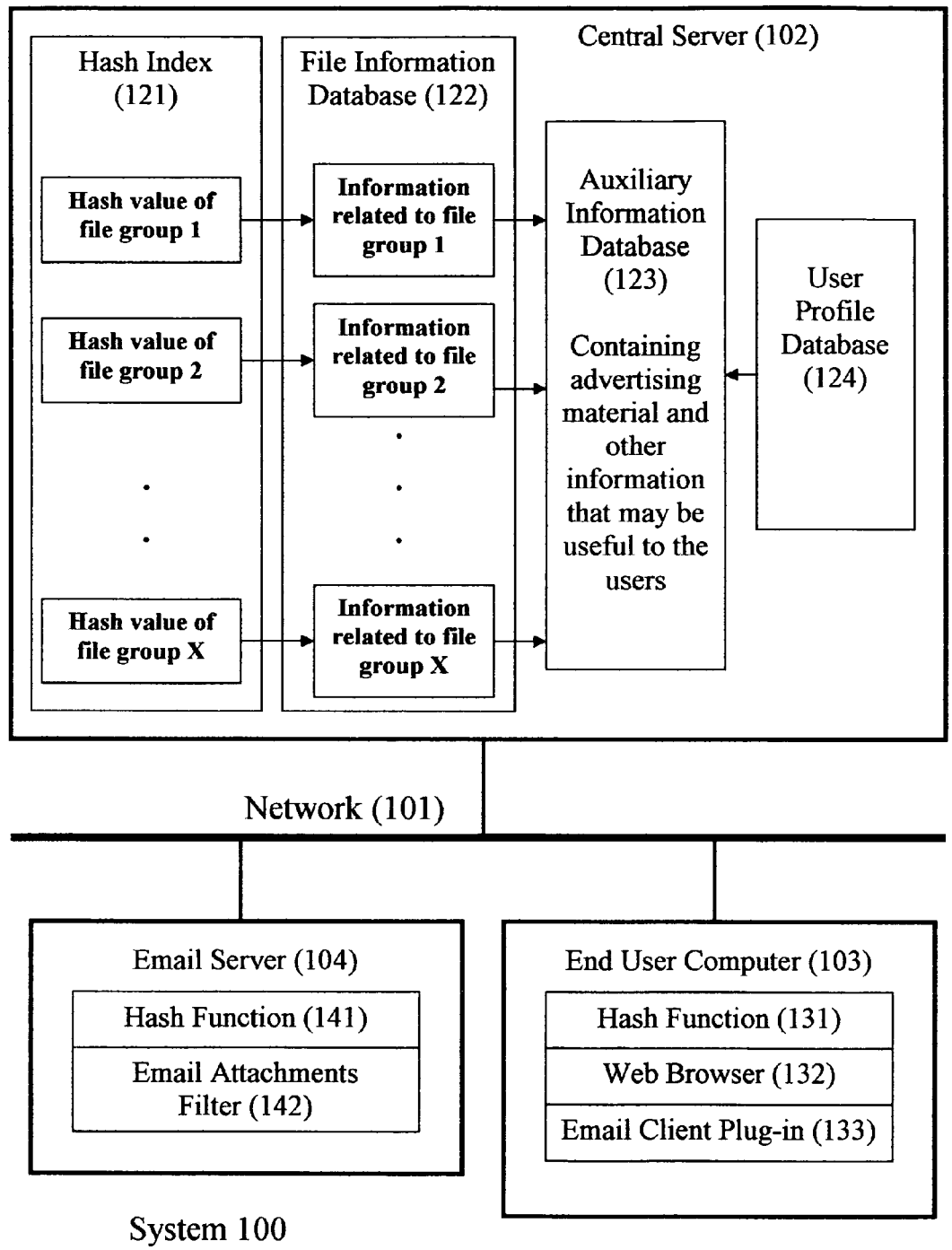
FIG. 1 shows the system of the improved IFSIC.

An improved IFSIC system is shown in FIG. 1. The system contains several improvements to the system described in U.S. Pat. No. 7,096,493, which is explicitly incorporated by reference here. The improved system 100 includes a central server 102 and at least one client computer coupled to a network 101, such as the Internet. The client computer can be any computer that needs to authenticate files through the central server 102. Two types of representative client computers are shown in FIG. 1; an end user computer 103 and an email server computer 104.

The central server 102 can be any type of server computer or a cluster of server computers, which upon receiving a request from the client computer 103 or 104 to authenticate a file or a group of files, returns the information about the file or the group of files. In one implementation, the client computer makes the request using HTTP or HTTPS protocol, and the central server returns a web page (hyper text mark-up language (HTML) document) statically stored or dynamically generated. Central server 102 includes a hash index 121, a file information database 122, an auxiliary database 123, and a user profile database 124.

File information database 122 includes a collection of data records related to the authenticity and other information about the files, such as file names, version numbers, author information, links to update pages, etc. Some of this other information may also reside in auxiliary information database 123. Hash index 121 includes a list of hash values of the files. Each hash value is computed from a group of files in a specific order. The group can contain one or more files. The hash values are computed using cryptographically-secure hash functions, such as message digest MD5 or Secure Hash Algorithm (SHA) or by multiple hash functions. Each hash value in hash index 121 can be used as an index to retrieve from file information database 122 the information related to the particular group of files. The information can contain authenticity and other information about the group of files. If the group contains more than one file, the order of the hash computation must be specific. In one implementation, the order of hash computation is fixed according to file names, for example, each file can be fed into the hash function in alphabetical order according the file name. In an alternative implementation, the order is determined by the content of the files instead of by the file names. For example, the file size and/or the numerical value of the first a few bytes of the file or an algorithm using data from each file can be used to determine the order of hash computation. The advantage of this alternative implementation is that the hash value will not depend on the file names. Even if the files are renamed, the resulting hash value will still be the same. Because different order of the hash computation on a group of files can result in a different hash value, there may be multiple hash value entries in the hash index 121 that correspond to the same group of files. In this case, these hash value entries may point to the same record in the file information database 122 or point to different records that are identical or nearly identical except that the record may contain information about the order of hash computation, which will be different. In any event, it is likely that each file in a group of more than one file will have a unique entry in hash index 121 and in file information database 122, thus allowing single file checks for any member of a multiple-file group without the requirement that the entire group be hashed. This allows for users to determine exactly which file of a multi-file group does not match. Further, misnamed files may be checked against these individual file entries to determine the correct file name and other associations.

The auxiliary information database 123 contains advertising materials and other information that may be useful to the users. The information can contain product information and website addresses of advertisers that sponsors the operation of the IFSIC. It can also include news, discussions, user comments, etc. that may be useful to the users. The information in the database 123 can be organized by categories and can be searched using certain key words or combination of key words. The auxiliary information database 123 can also include information about the file upgrades. For example, if one group of files is already out-of-date and a newer version is available, information about the new version such as new features and where to get it can be stored in the auxiliary information database 123 and linked to the entry corresponding to the old version stored in file information database 122. Because a given end-user computer 103 may be unaware of the various file groupings or hash calculation order for a specific version of a given application, database 123 also can contain information regarding the such and may be queried interactively or automatically by the hashing program(s). This is a particularly useful feature for applications, such as an operating system, that changes versions frequently, has many files in the group, and whose file components are unknown to most end-users. Using the retrieved information from database 123 allows the end-user to properly compute a hash for a group of files based upon name and/or version number of an application.

The user profile database 124 stores user specific information under a user identifier. In one implementation, the user identifier is a randomly or deterministically generated number to identify the user. In an alternative implementation, the user identifier is the user's email address. The user identifier can also include data to identify which type of the client computer is checking the file safety information, for example, whether it is an email server 104 or an end user computer 103, whether it is implemented as an email client plug-in, a browser plug-in, or a context menu add-in that pops up when the user right-clicks, or otherwise invokes the context menu for, a file or a group of files. The user profile can store information related to the user. For example, it can contain the number of files and the number of times a user has checked with the IFSIC, the category of these files, and which advertising link or news articles the user has clicked when they are displayed to the user along with the file authenticity information. Any information that helps in determining what type of information and advertising materials the user might be interested in can be stored in the user profile database 124. In one implementation, the user profile can contain a complete history or just a recent history of the hash values that the user has sent to the central server to check the file safety information. The user identifier, for example—an email address, is particularly useful for notification of malware found in applications that have been previously positively-authenticated by the end-user. This could be especially useful in stopping large-scale "bot" attacks in the future.

One type of client computer connected to the network 101 is the end user computer 103. Each end user computer 103 includes a hash function 131 and a web browser 132. It may also include an email client plug-in 133 if the user is interested in ensuring the safety of email attachment files. Hash function 131 is used to compute the hash of the files residing in storage, downloaded, received in email messages, or obtained from other sources. The hash algorithm (hash function 131) and the order of hash computation used in the end user computer 103 must be the same as those used in computing the hash values stored in the hash index 121 of the central server 102. Hash index 121 could have a plurality of hashes for each group, each hash corresponding to a different hash algorithm. This would allow for different hash programs to use different hash algorithms, but more importantly, allow for the easy addition of new secure hash algorithms in the future and, possibly, the elimination of hashes corresponding to hash algorithms determined to be insecure in the future. Web browser 132 can be used to send HTTP requests to the central server 102 and view the returned HTML data. Web browser 132 can be a standard browser such as Internet Explorer. Alternatively, the browser can be a specialized browser or part of the hash function 131 that is only used to display the data returned from central server 102. If a specialized browser is used, the data returned from the central server 102 does not have to be HTML, and the protocol does not have to be HTTP. Email client plug-in 133 is an add-on to an email program, such as Outlook or Outlook Express. Email client plug-in 133 is used to extract the file attachment from the email message received, use the hash function 131 to compute the hash value, get file safety information from the central server 102 using the hash value, and then decide whether the file attachment should be blocked. Email client plug-in 133 can be a function already integrated into the email client and does not necessarily has to be an add-on installed separately.

Another type of client computer connected to the network 101 is the email server 104. Each email server 104 is a typical server computer for receiving email messages in a corporate network or ISP except it includes a hash function 141 and an email attachment filter 142. Email server 104 can also be a "front-end processor" specialized in filtering email attachments before the email messages reach an email server. Hash function 141 is used to compute the hash of the files received in email messages. The hash algorithm (hash function 141) and the order of hash computation used in the email server 104 must be the same as one of those used in computing the hash values stored in the hash index 121 of the central server 102. Email attachment filter 142 is used to extract the file attachment from the email message received, use the hash function 141 to compute the hash value, get file safety information from the central server 102 using the hash value, and then decide whether the file attachment should be blocked. Email server 104 will decide whether to block a file attachment at the server level before allowing the users to download the email messages to their email clients. This will avoid the need for each user to install a plug-in. It is also allows the network administrator to implement a coherent email attachment filtering policy throughout the corporate network. This type of front-end processing can be in addition to other front-end processes, such as virus or spam filtering.

For diagnostic, data mining, and other purposes, the client computer 103 or 104 may keep a history of all the hashes, list of files, requests/responses to/from the central server 102 it has processed and the date and time these data are processed.

Figure 2:
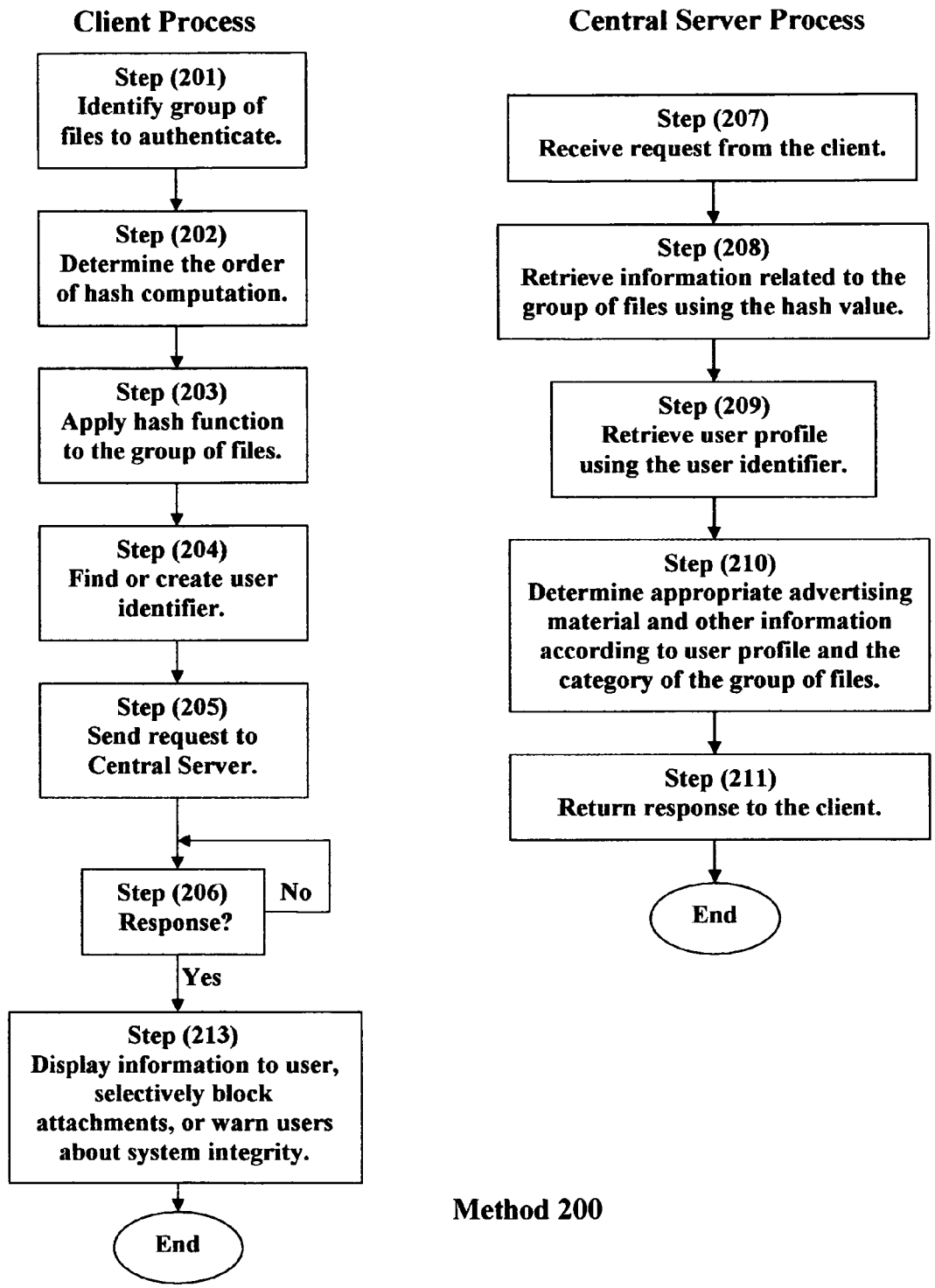
FIG. 2 shows the flow diagram of the improved process for authenticating a group of files.

Referring now to FIG. 2, a method 200 for verifying the authenticity of a file or a group of files is shown. The method includes a client portion and a server portion. The client portion is executed in the end user computer 103 or the email server 104. The server portion is executed in the central server 102. The method begins with the client portion and the identification of a file or a group of files to authenticate (201). The process can be initiated by the user's action, such as downloading a file using a browser, downloading an email messages which contains a file attachment, or right-clicking (or otherwise invoking a context menu) a file or a selected group of files and selecting the "Check File Safety" option on the context menu. The process can also be automatically started periodically to check the integrity of existing files, or triggered when a new file arrives in the computer, for example, when an email message with an attachment file arrives in email server 104. The files can be identified in various ways depending on the purpose this invention is used for. For example, if the purpose is to ensure the safety of files downloaded using a browser, then a browser plug-in can be implemented to identify the file just downloaded. If the purpose is to ensure the safety of file attachments received at the email server 104, the email attachment filter 142 can be used to identify and extract the attachment file. If the purpose is to ensure the safety of file attachments received by an email client at end user computer 103, the email client plug-in 133 can be used to identify and extract the attachment file from an email message. If the purpose is to ensure the integrity of the system files or programs installed on the end user computer 103, then a list of files included in the installation program or shipped with the system can be used to identify the files to authenticate. If the purpose is to randomly check a file or comprehensively check the entire computer file system, then a standalone hash function, such as hash function 131 can operate independently to accomplish these tasks. As mentioned previously, database 123 and/or database 122 may also have a list of the files that belongs to a specific version of an application and may be queried so the end-user will receive the correct file list. The file list and the order of hash computation can also be retrieved from other server(s) connected to Internet 101.

After step 201, the client process goes to step 202 to determine the order of hash computation. If there is only one file in the group, there is no need to determine the order of hash computation. If there is more than one file, the order of the hash computation must be consistent with the order of the hash computation used in computing the hash values stored in hash index 121 of the central server 122. In one implementation, the order of the hash computation is determined in alphabetical order according to the names of the group of files. In an alternative implementation, the order of hash computation is determined according to the numerical value of first a few bytes in the file or by an algorithm using data from each file. The advantage of this alternative implementation is that the hash value will not depend on the file names and will remain the same even if the files are renamed. If a list of files is used to identify the group of files to be authenticated in step 201, then the list may contain the information of the order of hash computation explicitly or implicitly. For example, the hash can be computed in the same order as the order of the files appearing in the list. The file list and the order of hash computation can be found locally or retrieved from the central server 102 or other server(s) connected to the Internet 101. The order of hash computation on a group of files does not have to be unique. The system may allow the hash to be computed in two or more different orders for the same group of files. In this case, there need to be multiple entries in the hash index 121 that correspond to the same group of files. These multiple entries can point to the same record in the file information database 122 or can point to separate entries that are identical or nearly identical.

After step 202, the client process goes to step 203 to apply hash function to the group of files identified at step 201 in the order determined at step 202. The hash function 131 or 141 is used to compute the hash. The hash function is first initialized, then the data in each file in the group is fed into the hash function in the order determined at step 202, and finally, the resulted hash value for the group is obtained from the hash function. In other words:

Hash for the group=HASH(file_1+file_2+ . . . +file_n);

where HASH is a hash function such as SHA1, "+" means the data are concatenated together. The order of file_1, file_2, . . . file_n is determined in step 202.

In an alternative implementation, a hash value is computed from each file in the group, then, the hash values from individual files are concatenated in the order determined in step 202, and finally, the hash value for the group is computed from these hash values.

In other words:

Hash for the group=HASH(HASH(file_1)+ HASH(file_2)+ . . . +HASH(file_n));

where the order of HASH(file_1), HASH(file_2), . . . HASH (file_n) are determined in step 202.

In a further alternative implementation, the hash value from each file is used to determine the order of hash computation and also used for computing the final hash for the group:

Hash for the group=HASH(HASH(file_$i_1$)+ HASH(file_$i_2$)+ . . . +HASH(file_$i_n$));

where the order of HASH(file_$i_1$), HASH(file_$i_2$), . . . , HASH (file_$i_n$) is determined according to the value of HASH (file_$i_1$), HASH(file_$i_2$), . . . , HASH(file_$i_n$). In this implementation, the determination of the order of hash computation is built into step 203 and step 202 can be ignored.

At step 204, the process finds a user identifier stored on the end user computer 103 or email server 104. If a user identifier is not found, the process can create an identifier for the user. In one implementation, the user identifier is a number randomly generated at the installation of the client program or the first time the client process is run or an email address entered by the end user. In the event that a user enters an email address, central server 102 may send a confirmation email to that email address to confirm that the end user is also the owner of access to that email address. For email server client (104), the user identifier can be the email address of the administrator of the email server 104. Instead of entered by the user, the user identifier can also be the recipient's email address extracted from the email message processed by the email server 104 or the email client plug-in 133. The advantage of using email address for user identifier is that, in case a file originally determined to be safe is later discovered to be malicious or unsafe, the end user can be notified by email. In a more secure implementation, a pair of public/private keys (or the like) may be generated to be associated with the user identifier. The private key can be stored locally and the public key can be sent to the central server 102 and stored in the user profile database 124. In this way requests from a specific user identifier can be digitally-signed and authenticated by central server 102. This is important in order to stop imposters from submitting bogus hash requests using another end-user's identifier. The integrity of the user profile database 124 depends upon the historical accuracy of requests from each end-user. If an email address is used for user identifier, a confirmation email may be sent to the email address after a public key is posted to the central server to confirm that the public key that was posted to user profile database 124 actually belongs to the owner of that email address.

After step 204, the client process goes to step 205 to send a request to the central server 102. The request includes the hash value computed at step 203 and the user identifier found or created at step 204. For diagnostic or data mining purposes, it can also include file names of the group of files identified at step 201, the order of hash computation determined at step 202, and a "client identifier" indicating whether the client is an email server (104), a browser plug-in, an email client plug-in, or an automatic integrity checking program, etc. The request can also contain information indicating how the group of files is identified at step 201, for example, whether the files are downloaded in a browser, received in an email as an attachment, selected by the user, or identified by an automatic integrity checking program. In one implementation, the request is passed to the web browser 132 as part of an URL (universal resource locator) pointing to the web server 102 and the browser 132 sends an HTTP request that contains the data to the web server 102. Thereafter, the client portion waits for a response from the server portion (step 206). The use of HTTP as a protocol is intended to include HTTPS or other similar secure protocols. As described previously, a pair of public/private keys can be associated with the user identifier. In this case, the request can be digitally-signed using the user's private key before sending it to the central server 102.

The central server portion begins at step 207 upon receipt of a request from a client. If the request is digitally-signed, the digital signature will be verified to ensure the authenticity of the request is mathematically intact, but also as to whether the correct user identifier is being used, before proceeding to the next step.

At step 208, the central server process uses the hash value found in the request to retrieve information about the group of files from the hash index 121 and the file information database 122. Then, at step 209, the central server process retrieves the user profile from the user profile database 124 using the user identifier found in the request. In one implementation, the user profile includes usage statistics such as the number of files in each category the user has looked for the authentication information. Such statistics can indicate which category of advertising material the user is likely to be interested in. The information contained in the request can be also used to update such statistics at this step. After this step, the process proceeds to step 210.

At step 210, the central server process determines appropriate advertising material and other information to be displayed to the end user. Such information can be retrieved from the auxiliary information database 123 according to the user profile and the category of the group of files being checked. Auxiliary information database 123 may not physically be part of central server 102 but must be immediately available, probably via network 101. For example, if a file being checked is a C++ compiler and/or the user profile indicates that the user is a programmer (having checked many programming related files), then a number of programming related advertising materials or news articles can be selected. If there are several advertisers competing for the limited advertising spaces, the advertisers may be allowed to bid on the price per click on the advertised link and the advertising materials may be selected according to the highest bids. Advertising a new version of a file or a group of files is a special case of advertising. If the file or the group of files being checked is already out-of-date and a new version is available, the information about the new version such as new features and where to get it can be retrieved from the auxiliary information database 123. If a "client identifier" indicates that the client is a type of client that does not display information to the end user, then there is no need to send to the client any advertising materials and other human readable information. For example, if the client is an email server 104, an email plug-in that merely determines whether to block a file attachment or if the client is a program that is running in the background to periodically check the system integrity, then it is unlikely that advertising information would reach the end user. In this case, step 210 can be ignored.

At step 211, the central server returns a response to the client 103 or 104. If the client is capable of displaying information to the end user, the response will contain information retrieved from the file information database 122 at step 208 and advertising materials and information obtained from the auxiliary information database 123 at step 210. In one implementation, the data returned is in the form of an HTML page that includes authentication information associated with the file or the group of files and advertising materials and other information generally useful to the user. If the client does not display information to the end user, then the response can be a simple code indicating whether the file is authentic and safe, unknown as to safety, or known to be unsafe. It can also return an indicator of the relative level of risks associated with the file or the group of files. After step 211, the server portion of the process ends.

Returning to the client portion, the client 103 or 104 receives the response from central server 102 and acts upon it. If the client is a type that can display information to the end user, the client will displays the file authenticity information to the user along with appropriate advertising information and other type of information that the user may be interested in. If the client is an email server 104 or an email client plug-in, it will selectively block or allow files attached to the email message according to the response from the central server 102 and established local policy. For example, the response from the central server 102 may indicate that a file is known to be safe, unknown as to safety, or known to be unsafe. A reasonable local policy might be: If the file is known to be safe, allow it; if the to file is known to be unsafe, block it; if the file is unknown as to safety, then block potentially harmful file types such as .exe, .bat, .vbs. etc. and allow harmless file types such as .txt, .pdf, etc. If the client is an automatic program running in the background to check the system integrity, then it will remain quiet if the authenticity of the files is verified, but will alert the user otherwise. (If any file is changed, the hash value will not be the same, and the file authenticity cannot be verified). In one implementation, if a group of files cannot be authenticated using the hash value computed from the group, then each individual file in the group can be checked to determine which of the individual files has been modified or is out-of-date or bogus. Thereafter, the process ends.

The current invention can be used to ensure the integrity of the entire client computer system and to discover unwanted programs installed without user's permission. To accomplish this, the vendors of the operating system or application programs should register the hash value of every EXE, DLL, and other types of potentially harmful executable files or scripts contained in their operating system or application programs with the central server 102. Then, Method 200 described in FIG. 2 can be invoked by the operating system or a program running in the background in the client computer to automatically check every file that belongs to potentially harmful file types, such as executable files (EXEs) dynamical link libraries (DLLs), and various types of active script files. The operating system or the program running in the background can enumerate all files of a particular type found in the system and invoke Method 200 to check the authenticity and safety of each file and alert the user if the authenticity and safety of any file cannot be verified. Archives, such as a compressed ZIP archive can be temporarily decompressed to check the authenticity and safety of files contained in the archive. In this way, spyware, adware, and other types of malicious or unwanted programs that may be installed without user's approval can be discovered and removed. To reduce the bandwidth, several files that belong to an unchangeable part of the operating system or an installed program can be bundled into a group so that only one hash value needs to be computed and sent to the central server 102 to check the authenticity and safety of the group of files. Lists that identify such groups of files can be shipped with the operating system, installed with the application program, updated during software upgrades, or to downloaded from a server on the Internet. The operating system or the program running in background can first use these lists to identify groups of files and check their authenticity and safety, and then check the authenticity and safety of each of the files that does not belong to any group. These checks do not have to be carried out one-by-one. Several or all of them can be bundled into one communication with the central server. For example, multiple hash values computed from multiple groups and individual files can be packed into one request to be sent to the central server 102, and the central server 102 can return one response that contains the authenticity and safety information of all these groups and individual files.

The usefulness of the system 100 largely depends on the information stored in file information database 122. Any type of information related to a file or file group can be stored in the file information database 122 under the hash value computed from the file or file group. The information can be obtained in many ways. For example, the authors of software programs or other digital contents can submit their files and other information to the central server 102 operator and the central server 102 operator may conduct virus scan and other studies on the files submitted to create the safety information. It may be possible to have vendors pay for such a listing. Users of the programs and other digital content can also submit information to the central server 102 operator. Alternatively, central server 102 operator can also act on his/her own to find files from the internet, study them, and put the result of the study into the file information database 122. The process can be automated to find and index all or substantially all files available on the Internet. For example, a program much like a robot or crawler (collectively "Robot") used in a search engine for indexing web pages can be used to automatically download web pages and follow the hyperlinks to more pages to find downloadable programs and other digital content and study them. If a malicious program is found, which may be submitted by hackers without the knowledge and approval of the site owner, the site owner can be contacted. Such a Robot can even be used for discovering illegal copies of digital content distributed over the internet. For example, the Robot can find all URLs where a file with a given hash value are found. These URLs can be put into the corresponding entry in the file information database 122. The vendor of a digital content can compute a hash from their digital content and check with central server to find out all the URLs where their digital content is found. This could be a service that could be paid for by the venders. Any unauthorized URL is a place where illegal copies are distributed.

The system discussed above provides several improvements to the system described by Gary Liu in the co-owned U.S. Pat. No. 7,096,493. First, it provides a way to support the IFSIC by advertising and other methods. The information about the file retrieved from the IFSIC can now include advertising materials related to the type of files being checked. Also because the user can now be identified, the advertising can be more targeted. The same advertising infrastructure can also be used to provide information about the file upgrades and other information that may be interesting to the users. Another advantage of including a user identifier is that the user can be notified if a file or a group of files originally thought to be safe is later discovered to be unsafe or has serious flaws. Second, the IFSIC can now be used to automatically check for system integrity and discover unwanted programs, such as spyware and adware more efficiently. Because a group of many files can be included to compute one hash value to check with the central server, the bandwidth required at the central server is greatly reduced. Third, the improved IFSIC provides a better filter for email attachments. Instead of indiscriminately blocking certain type of file attachments, email clients can check with the IFSIC and allow attachment files that are safe and block unknown or unsafe files, based upon local policy. The advantage of such a filter is that it works even if the attachment is renamed to a different file type, because the hash value computed from a file is not changed by renaming a file. Such a filter not only can be installed at the recipient end, it can also be used by the sender before sending an email. In this way, the sender can make sure that attachment will not be blocked at the recipient's end. This will avoid frustrations that a sender can successfully send an attachment in an email message but only find out later that the email message and/or the attachment is blocked at the recipient's end. Furthermore, the system can be used to index all or substantially all of the digital content according to the hash value of such content to discover malicious programs or illegal copies of various types of content and applications distributed over the Internet.

While this invention has been described in terms of several preferred implementations, it is contemplated that alterations, modifications and permutations thereof will become apparent to those skilled in the art upon a reading of the specification and study of the drawings.

Furthermore, certain terminology has been used for the purposes of descriptive clarity, and should not be construed to limit the invention. It is therefore intended that the following appended claims include all such alterations, modifications and permutations as fall within the true spirit and scope of the present invention.

What is claimed is:

1. A system for enhancing safety of computer file distribution comprising:
   a server computer connected to a computer network;
   one or more electronic records stored in the server computer, wherein the server computer is configured to assign safety information to each electronic record, the safety information specifying whether a file group containing a plurality of files is known to be authentic and safe, unknown as to safety, or known to be unsafe, wherein each electronic record is indexed by a hash value computed from the file group, and wherein the hash value is computed from the file group according to a hash calculation order;
   a database, stored in the server computer, including order information that defines the hash calculation order for the file group; and
   at least one user terminal connected to the computer network, the user terminal operable to verify the authenticity of an identified file group, including:
      querying the server computer to provide the order information for the identified file group;
      receiving the order information from the server computer;
      computing a hash value of the identified file group by hashing a plurality of files in the identified file group in accordance with the hash calculation order defined by the received order information;
      requesting, from the server computer, the safety information about the identified file group by submitting a request to the server computer which includes the computed hash value along with information identifying a user of the user terminal;
      in response to the request, receiving, from the server computer, the safety information for the identified file group and auxiliary information, wherein the auxiliary information is different from the safety information and based at least in part on the information identifying the user; and
      displaying the safety information for the identified file group along with the auxiliary information.

2. The system of claim 1 wherein the auxiliary information includes update information related to the file group.

3. The system of claim 1 wherein the auxiliary information is determined by the server computer including considering a category of the file group.

4. The system of claim 1 wherein the auxiliary information is determined by the server computer including considering a category of the identified file group and the information identifying the user.

5. The system of claim 1 wherein a pair of public and private keys associated with the information identifying the user is used for authenticating the user.

6. The system of claim 5 wherein the information identifying the user is an email address and a confirmation email is sent to the email address to confirm that an owner of the pair of public and private keys has access to the email address.

7. The system of claim 1 wherein the information identifying the user is an email address.

8. A system, comprising:
   a server computer configured to store one or more electronic records, each electronic record associated with a file group containing a plurality of files, wherein the server computer is further configured to assign to each electronic record safety information specifying whether the file group is known to be authentic and safe, unknown as to safety, or known to be unsafe, wherein the one or more electronic records are each indexed according to a hash value computed from the file group associated with the electronic record, and wherein each hash value is computed from the file group according to a hash calculation order;
   a database, stored in the server computer, including order information that defines the hash calculation order for the file group; and
   a second computer operable to query the server computer to provide the order information for an identified file group, receive the order information from the server computer, compute a hash value of the identified file group in accordance with the hash calculation order defined by the received order information, request safety information for the identified file group including sending the computed hash value to the server computer and an identifier associated with a user making the request, receive the safety information and auxiliary information based on at least in part on the identifier and display the safety information and the auxiliary information.

9. The system of claim 8 wherein an operator of the second computer will be alerted if the safety information associated with the identified file group retrieved from the server computer does not confirm that at least one file is authentic.

10. The system of claim 8 wherein when the safety information associated with the file group retrieved from the server computer does not confirm that the file group is authentic, the second computer will check the authenticity of each file in the file group by computing a hash value from each file and retrieve the safety information associated with that file from the server computer to determine which file or files in the file group failed an authenticity test.

11. A system, comprising:
   a server computer configured to store one or more electronic records, each electronic record associated with a file group containing a plurality of files, wherein the server computer is further configured to assign to each electronic record safety information specifying whether the file group is known to be authentic and safe, unknown as to safety, or known to be unsafe, wherein the one or more electronic records are each indexed according to a hash value computed from the file group associated with the electronic record, and wherein each hash value is computed from the file group according to a hash calculation order;

a database, stored in the server computer, including order information that defines the hash calculation order for the file group; and a second computer operable to identify an email message that includes an identified file group as an attachment, query the server computer to provide the order information for the identified file group, receive the order information from the server computer, compute a hash value of the identified file group attached to the email message in accordance with the hash calculation order defined by the received order information, request safety information for the identified file group including sending the computed hash value and identifying data for a user making the request to the server computer so as to retrieve safety information associated with the identified file group, and use the safety information returned from the server computer to decide whether to allow the file group to be transmitted or received in the email message.

12. The system of claim 11 wherein the second computer is an email server or is an email front-end processor.

13. The system of claim 11 wherein the second computer is an end user computer with an email client.

14. The system of claim 11 wherein a local policy is used, in conjunction with the safety information returned from the server computer, to decide whether to allow the file group to be transmitted or received in the email message.

15. A system, comprising:
a server computer configured to store one or more electronic records, each electronic record associated with a file group containing a plurality of files, wherein the server computer is further configured to assign to each electronic record safety information specifying whether the file group is known to be authentic and safe, unknown as to safety, or known to be unsafe, wherein the one or more electronic records are each indexed according to a hash value computed from the file group associated with the electronic record, and wherein each hash value is computed from the file group according to a hash calculation order;

a database, stored in the server computer, including order information that defines the hash calculation order for a respective file group associated with each electronic record; and a second computer operable to identify each potentially harmful file group in the second computer, query the server computer to provide the order information for an identified file group, receive the order information from the server computer, compute a hash value of the identified file group in accordance with the hash calculation order defined by the received order information, send a request to the server computer that includes the computed hash value and identity information of a user associated with the request to receive the safety information associated with the identified file group and auxiliary information based on the identity information, and display the safety information along with the auxiliary information.

16. The system of claim 15 wherein the second computer is further operable to alert a user of the second computer if the safety information retrieved from the server computer fails to verify the safety of the identified file group.

17. The system of claim 15 wherein the potentially harmful file group is identified according to a file type.

18. The system of claim 17 wherein the file type includes executable files and/or dynamical dynamic libraries.

19. The system of claim 15 wherein the hash calculation order for a file group is determined according to a name of each file in the file group.

20. The system of claim 15 wherein the hash calculation order for a file group is determined according to data of each file in the file group.

21. The system of claim 15 wherein the hash calculation order for a file group is determined according to a file identifier algorithmically computed from data from each file in the file group.

22. The system of claim 15 wherein the hash calculation order for a file group is determined according to a second hash value computed from each file in the file group and the second hash value computed from each file in the file group is used to compute the hash value for the file group.

23. A method comprising:
assigning safety information to each of a plurality of file groups at a server computer, each file group containing a plurality of files, wherein the safety information indicates whether the file group is known to be authentic and safe, unknown as to safety, or known to be unsafe;

storing one or more electronic records at or in association with the server computer, wherein each electronic record includes safety information assigned to a file group, wherein each of the one or more electronic records is indexed by a hash value computed from a respective file group of the plurality of file groups, wherein the hash value is computed from the respective file group according to a hash calculation order that is based on one or more criteria, and wherein the hash value is computed according to the hash calculation order;

determining the hash calculation order for the respective file group including storing order information that defines the hash calculation order associated with the respective file group in a database stored in or associated with the server computer;

receiving a query, at the server computer, to provide order information for an identified file group;

providing the order information responsive to the request;

receiving a request, at the server computer, to verify the identified file group including receiving a hash value calculated from the identified file group in accordance with the hash calculation order defined by the provided order information and an identifier associated with a user making the request;

comparing the received hash value with the computed hash value associated with an electronic record of the one or more electronic records stored at or in association with the server computer;

retrieving auxiliary information based at least in part on the identifier; and providing the safety information assigned to the identified file group and the auxiliary information in response to the received request.

* * * * *

UNITED STATES PATENT AND TRADEMARK OFFICE
CERTIFICATE OF CORRECTION

| | | |
|---|---|---|
| PATENT NO. | : 8,607,335 B1 | Page 1 of 1 |
| APPLICATION NO. | : 11/636009 | |
| DATED | : December 10, 2013 | |
| INVENTOR(S) | : Liu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this
Nineteenth Day of May, 2015

Michelle K. Lee
*Director of the United States Patent and Trademark Office*